United States Patent
Strand et al.

(10) Patent No.: US 8,760,426 B1
(45) Date of Patent: Jun. 24, 2014

(54) DOMINANT HAND DETECTION FOR COMPUTING DEVICES

(75) Inventors: William Alexander Strand, Issaquah, WA (US); Luan K. Nguyen, Auburn, WA (US)

(73) Assignee: Amazon Technologies, Inc., Reno, NV (US)

( * ) Notice: Subject to any disclaimer, the term of this patent is extended or adjusted under 35 U.S.C. 154(b) by 144 days.

(21) Appl. No.: 13/429,843

(22) Filed: Mar. 26, 2012

(51) Int. Cl.
| | |
|---|---|
| G06F 3/041 | (2006.01) |
| G06F 3/02 | (2006.01) |
| G09G 5/00 | (2006.01) |
| G06F 3/048 | (2013.01) |
| G06F 3/14 | (2006.01) |
| G06F 3/00 | (2006.01) |

(52) U.S. Cl.
USPC ............ 345/173; 345/169; 715/773; 715/864; 715/866

(58) Field of Classification Search
USPC .................................................. 345/156–184
See application file for complete search history.

(56) References Cited

U.S. PATENT DOCUMENTS

| | | | | |
|---|---|---|---|---|
| 6,538,636 | B1 * | 3/2003 | Harrison ....................... | 345/156 |
| 8,537,115 | B2 * | 9/2013 | Hotelling et al. ............. | 345/163 |
| 2007/0236460 | A1 * | 10/2007 | Young et al. .................. | 345/169 |
| 2009/0251435 | A1 * | 10/2009 | Westerman et al. .......... | 345/173 |
| 2010/0097331 | A1 * | 4/2010 | Wu ................................ | 345/173 |
| 2010/0177121 | A1 * | 7/2010 | Homma et al. ............... | 345/659 |
| 2013/0041290 | A1 * | 2/2013 | Kording et al. ............... | 600/595 |

FOREIGN PATENT DOCUMENTS

WO  WO 2009090704 A1 * 7/2009

OTHER PUBLICATIONS

H. Lee and Y. S. Choi, "Fit your hand: Personalized user interface considering physical attributes of mobile device users," in Proceedings of the 24th Annual ACM Symposium Adjunct on User Interface Software and Technology, Santa Barbara, California, USA, 2011.*

Beverly L. Harrison, Kenneth P. Fishkin, Anuj Gujar, Carlos Mochon, and Roy Want. 1998. Squeeze me, hold me, tilt me! An exploration of manipulative user interfaces. In Proceedings of the SIGCHI Conference on Human Factors in Computing Systems (CHI '98), Clare-Marie Karat, Arnold Lund, Joëlle Coutaz, and John Karat (Eds.). ACM Press/Addison-Wesley.*

* cited by examiner

*Primary Examiner* — Ariel Balaoing
*Assistant Examiner* — Larry Sternbane
(74) *Attorney, Agent, or Firm* — Thomas | Horstemeyer, LLP (57) ABSTRACT

Disclosed are various embodiments for dominant hand detection in a computing device such as a mobile computing device. A dominant hand preference of a user of the computing device is automatically detected. A user interface rendered by the computing device is automatically adapted based at least in part on the dominant hand preference.

21 Claims, 8 Drawing Sheets

DOMINANT HAND DETECTION FOR COMPUTING DEVICES

BACKGROUND

Humans often have a dominant hand, resulting from unequal distribution of fine motor skills between the left and right hands. An individual who is more dexterous with the right hand is called right-handed, and one who is more skilled with the left is said to be left-handed. Some people are equally skilled with both hands and are called ambidextrous. Many theories exist to explain the cause of handedness, which may include biological and environmental factors.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to detecting a dominant hand in the context of computing devices such as mobile computing devices. Right-handed people and left-handed people may prefer to use their mobile computing devices differently. To this end, different user interfaces may be generated for right-handed users versus left-handed users. A right-handed user may prefer to use controls situated on the right side of a touchscreen display, while a left-handed user may prefer to use controls situated on the left side of the touchscreen display. Other users may be equally comfortable with using one or both hands, making either interface or a mixture of the two an appropriate choice. There may be many variations on this, such as locating more important controls on one side of the display versus the other. To enable such customized user interfaces according to various embodiments of the present disclosure, the dominant hand of the user is ascertained.

However, for an optimal user experience, it may be preferable not to ask the user for a dominant hand preference explicitly. Requiring explicit input from the user may lead to frustration and non-compliance. Various embodiments of the present disclosure automatically determine (i.e., without explicit user intervention) the dominant hand of the user through the ordinary use of a mobile computing device. Many factors may be considered in such a determination, for example, how a user picks up the mobile computing device, how the user carries the mobile computing device, how the user interacts with a touchscreen of the mobile computing device, and so on. An initial determination may be made for the user associated with the mobile computing device. The initial determination may be revised in some embodiments to account for different, potentially ephemeral, users of the mobile computing device. In the following discussion, a general description of the system and its components is provided, followed by a discussion of the operation of the same.

Figure 1:
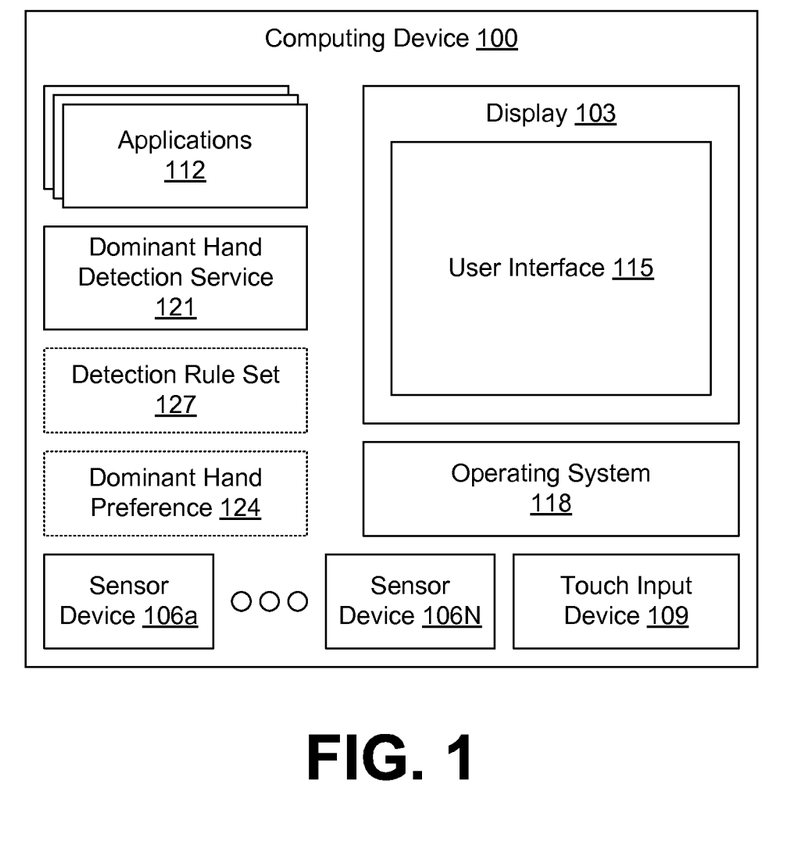
FIG. 1 is a drawing of a computing device according to various embodiments of the present disclosure.

With reference to FIG. 1, shown is a computing device 100 according to various embodiments. The computing device 100 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The computing device 100 may correspond, for example, to a mobile computing device 100, a handheld computing device 100, etc.

The computing device 100 may include a display 103. The display 103 may comprise, for example, one or more devices such as cathode ray tubes (CRTs), liquid crystal display (LCD) screens, gas plasma-based flat panel displays, LCD projectors, or other types of display devices, etc. The computing device 100 may include a plurality of sensor devices 106a ... 106N. The sensor devices 106 may include ambient light sensors, digital cameras, accelerometers, gyroscopes, altimeters, global positioning system (GPS) receivers, thermal sensors, microphones, moisture sensors, and so on. The computing device 100 may include a touch input device 109 such as a touch screen, a touch pad, and/or other touch devices.

The computing device 100 may be configured to execute various applications 112 such as browsers, multimedia players, games, instant message clients, electronic book readers, document viewers, mobile applications 112, office productivity applications 112, social networking applications 112, photo manipulation applications 112, video editing applications 112, and/or other applications 112. Each of the applications 112 may be configured to render a respective user interface 115 on the display 103. The computing device 100 may be configured to execute an operating system 118 such as, for example, ANDROID, MICROSOFT WINDOWS, APPLE IOS, LINUX, etc.

The computing device 100 executes a dominant hand detection service 121 which is configured to automatically detect a dominant hand preference 124 of a user of the computing device 100. That is to say, a user may have a dominant hand preference 124 for the left hand or the right hand. Alternatively, some users may be ambidextrous and nearly equally able to use either the left or right hands, or both left and right hands simultaneously. The dominant hand detection service 121 detects the dominant hand preference 124 based, for example, on user input data relative to the touch input device 109, sensor data generated by the sensor devices 106, and/or other data. The dominant hand detection service 121 may evaluate the data against a detection rule set 127 to make a determination.

The computing device 100 may store various data such as the dominant hand preference 124, the detection rule set 127, and/or other data. The dominant hand preference 124 may indicate a preference for a dominant hand, or for both hands, if such a preference has been determined by the dominant hand detection service 121. In one embodiment, multiple dominant hand preferences 124 may be stored, where each of the dominant hand preferences 124 is associated with a different user and/or a different context of using the computing device 100 (e.g., a different application 112, a different user interface 115 rendered by an application 112, and so on).

The detection rule set 127 includes various rules that are evaluated against the sensor data and/or touch input data to determine whether the user meets a left-handed preference profile, a right-handed preference profile, or a preference profile associated with using both hands. The detection rule set 127 may be created using a control set of data for a multitude of users having known dominant hand preferences. To this end, the detection rule set 127 may be generated using a machine learning approach. The control set of data may be referred to as a "golden" set of data in the field of machine learning.

Next, a general description of the operation of the various components of the computing device 100 is provided. The user begins using the computing device 100. As the user uses the computing device 100, the dominant hand detection service 121 may execute in the background, continuously or periodically, to gather data. The data is obtained implicitly through ordinary use of the computing device 100 by the user irrespective to the dominant hand preference detection. The data may include various sensor data acquired from the sensor devices 106. The data may also include touch input data created as a result of the user interacting with the touch input device 109.

The dominant hand detection service 121 is configured to automatically detect the dominant hand preference 124 based at least in part on the sensor data and/or the touch input data. To this end, the dominant hand detection service 121 may include a pipeline of classifiers that evaluate the various data with respect to the criteria in the detection rule set 127. The detection rule set 127 may specify various thresholds which are compared with the acquired data values. The acquired data values may be filtered to exclude noise in some embodiments.

In one embodiment, the detection rule set 127 is preconfigured on the computing device 100 before the computing device 100 is delivered to the user. In another embodiment, the detection rule set 127 is loaded on the computing device 100 when the dominant hand detection service 121 is installed on the computing device 100. In yet another embodiment, the dominant hand detection service 121 obtains the detection rule set 127 on demand by way of a network. In still another embodiment, the detection rule set 127 and a portion of the dominant hand detection service 121 is hosted by a server on a remote computing system accessible by way of a network. In such a case, the dominant hand detection service 121 may communicate with the server to accomplish the task of dominant hand detection.

Various non-limiting examples of data that may indicate a dominant hand preference 124 will next be described. As a first example, the sensor data may include data corresponding to the user picking up the computing device 100. The computing device 100 may be a mobile computing device 100 such as a handheld smartphone, tablet, etc. which is situated against a surface. When the user picks up the computing device 100, if the user has a dominant hand, the user will likely pick up the computing device 100 from the side corresponding to the dominant hand.

Accordingly, readings from accelerometers, gyroscopes, light sensors, thermal sensors, moisture sensors, microphones, etc. may be used to determine that the computing device 100 is being picked up from the left side or the right side. The accelerometer may indicate that the device is being picked up from a resting position, while a gyroscope may indicate an orientation towards the left or right side, depending on how the user is holding the computing device 100. To illustrate, if the user picks up the device from the right side with the right hand, the computing device 100 may tend to be oriented such that the right side is elevated above the left. Also, a thermal sensor, moisture sensor, microphone, or touch sensor may be used on the case of the computing device 100 to determine on which side it is being held.

The dominant hand detection service 121 may compare the data gathered from the picking up of the computing device 100 with a left-handed pickup profile and a right-handed pickup profile as defined by the detection rule set 127. Depending on the frequency of such identification and/or other detected factors, a dominant hand preference 124 may be ascertained or inferred. If the user appears to pick up the computing device 100 randomly on various sides, the data may weigh towards a preference for the use of both hands and/or no detected preference.

As a second example, the sensor data may include data corresponding to the user carrying the computing device 100, e.g., in a pocket. The computing device 100 may be a mobile computing device 100 such as a handheld smartphone, tablet, etc. which is situated against a surface. When the user places the computing device 100 in a pocket, if the user has a dominant hand, the user may, for example, prefer to place the computing device 100 in a pocket corresponding to the side of the dominant hand.

The dominant hand detection service 121 may analyze the data gathered from placing the computing device 100 in the pocket to determine whether the pocket correspond to a left-handed pocket profile or a right-handed pocket profile as defined by thresholds or other criteria in the detection rule set 127. Depending on the frequency of such identification and/or other detected factors, a dominant hand preference 124 may be ascertained or inferred. If the user appears to place the computing device 100 randomly in different pockets, the data may weigh towards a preference for the use of both hands and/or no detected preference. In some scenarios, the dominant hand detection service 121 may analyze the data gathered to estimate a gait of the user to determine whether the computing device 100 is carried in a left or right pocket and/or by the left or right hand.

As a third example, the touch input data may include data indicating various touches or gestures relative to the touch input device 109. The dominant hand detection service 121 may determine an activity frequency of the user relative to each one of multiple regions on the touch input device. For example, frequent initial touches in a right-side region of the touch input device 109 to form a gesture may weigh toward recognition of a right-handed preference. By contrast, frequent initial touches in a left-side region of the touch input device 109 to form a gesture may weigh toward recognition of a left-handed preference.

The determination may be made with respect to thresholds or other criteria specified in the detection rule set 127. The activity frequencies relative to the regions may be evaluated against the thresholds or other criteria. Depending on the frequency of such touches and/or other detected factors, a dominant hand preference 124 may be ascertained or inferred. If the user appears to touch the left region and/or the right region of the touch input device 109 with a statistically insignificant difference, the data may weigh towards a preference for the use of both hands and/or no detected preference.

Various touch interactions with the touch input device 109 may be termed "gestures." The detection rule set 127 may include thresholds and/or criteria to be evaluated for gestures. To the extent that the touch of the user may correspond to a gesture having a certain shape and/or direction, the dominant hand detection service 121 may identify a dominant hand preference 124 based on the shapes and directions for multiple gestures performed by the user.

Figure 2:
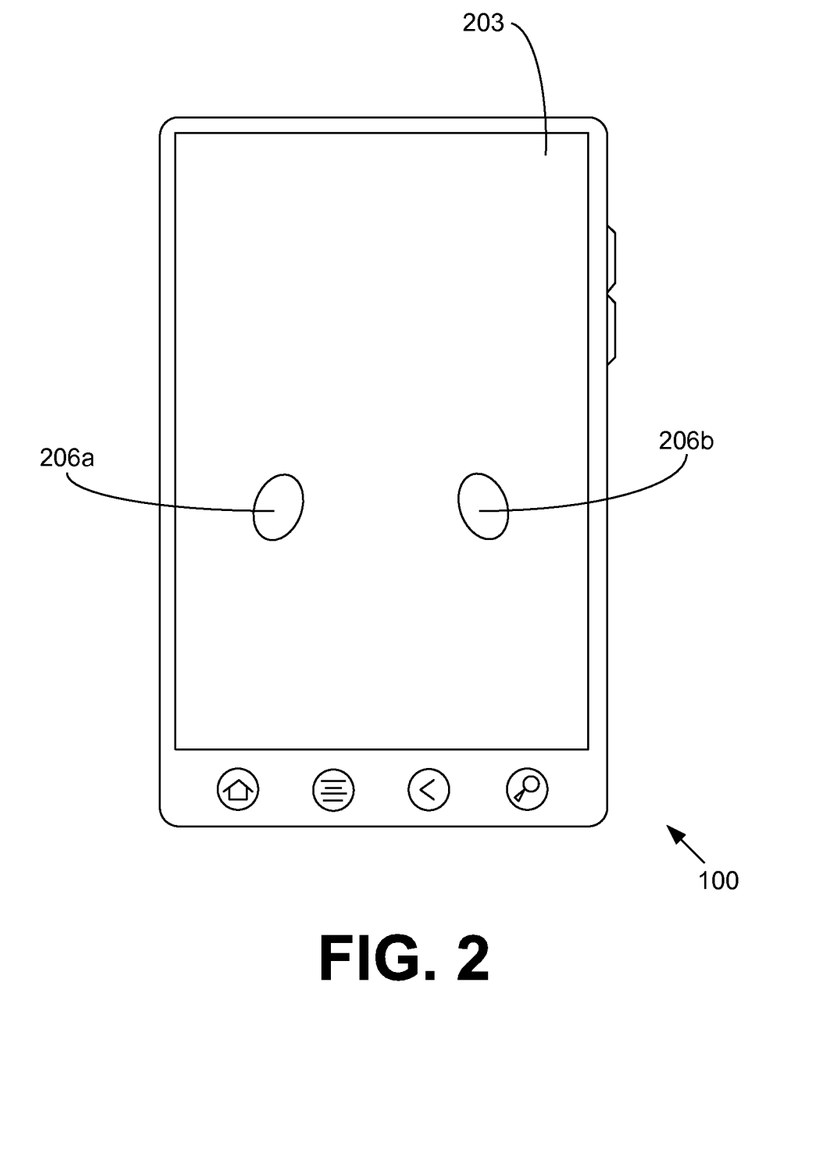
FIG. 2 is a drawing of an example of different touch imprints on a touch screen of the computing device of FIG. 1 according to various embodiments of the present disclosure.

The touch imprint shape on the touch input device 109 may be a factor, as will be discussed in the next example with reference to FIG. 2. FIG. 2 illustrates one example of a hand-held computing device 100 having a touch screen 203, which includes both a display 103 (FIG. 1) and a touch input device 109 (FIG. 1). Two exemplary touch imprints 206a and 206b are shown relative to the touch screen 203. Each of the touch imprints 206 corresponds to a finger imprint of a user on the touch screen 203. It is noted that touch imprints 206a and 206b are different. Touch imprint 206a is oblong and oriented to the right, which may be indicative of an imprint from a left hand finger. However, touch imprint 206b is oblong and oriented to the left, which may be indicative of an imprint from a right hand finger.

The determination of the shape of the touch imprints 206 may be made with respect to thresholds or other criteria specified in the detection rule set 127 (FIG. 1). Depending on the frequency of similar touch imprints 206 and/or other detected factors, a dominant hand preference 124 (FIG. 1) may be ascertained. If the user appears to touch with both hands with a statistically insignificant difference, or if the shapes are not automatically distinguishable, the data may weigh towards a preference for the use of both hands and/or no detected preference.

Returning now to FIG. 1, once a dominant hand preference 124 is automatically detected, the dominant hand preference 124 may be utilized to adjust and customize user interfaces 115 rendered by the computing device 100 on the display 103. This adjustment may correspond to a "reflow" of the user interfaces 115 and/or a selection of different user interfaces 115. The user interfaces 115 may correspond to various applications 112 in the computing device 100. For example, in a media player user interface 115, a volume slider may be oriented at an expected position of the thumb of the dominant hand.

To illustrate, if a left-hand preference is determined, a user interface 115 may be automatically adjusted such that frequently used controls are located toward the left side of the user interface 115. Conversely, if a right-hand preference is determined, the user interface 115 may be automatically adjusted such that frequently used controls are located toward the left side of the user interface 115. Further, controls intended to be used by the non-dominant hand (e.g., controls on the side of the user interface 115 corresponding to the non-dominant side) may be made larger to facilitate ease of selection with the non-dominant hand.

The dominant hand preference 124 may be made available to the applications 112 by way of an application programming interface (API). The applications 112 may then use this information to decide when and how to adjust their respective user interfaces 115. Alternatively, the operating system 118 and/or user interface libraries may use this information to automatically adjust the user interfaces 115 without any explicit programming by the developers of the applications 112.

Although it is contemplated that the dominant hand preference 124 may be customarily detected without an intentional indication of the dominant hand preference 124 by the user and without prompting of the user, the dominant hand detection service 121 may request user confirmation in some embodiments. If confirmation or rejection is not explicitly provided, the dominant hand detection service 121 may discard the dominant hand preference 124 or establish the dominant hand preference 124 in various embodiments.

In one embodiment, the dominant hand preference 124 may be a permanent setting for the computing device 100. In another embodiment, the dominant hand preference 124 may be a permanent setting tied to the specific user. If associated with a user, the dominant hand preference 124 may be transferred via network to a server which may publicize the dominant hand preference 124 for use on other computing devices 100 in use by the user. The dominant hand preference 124 may also be associated with specific applications 112 or user interfaces 115 of applications 112. As other users ephemerally use the computing device 100, the dominant hand detection service 121 may continue to run and determine potentially changed dominant hand preferences 124 for the ephemeral users.

Also, as a user continues use of the computing device 100, the dominant hand preference 124 of the user may change and may be updated by the dominant hand detection service 121. In some cases, the dominant hand preference 124 may be detected inaccurately. In such cases, additional data that is gathered may enable a recalibration of the dominant hand preference 124. For example, a user interface 115 may be adapted for left-handed use. The user may repeatedly miss a button located on the left side of the user interface 115 or hit the right side of the button rather than the left side. Consequently, the dominant hand detection service 121 may recalibrate the dominant hand preference 124 for right-handed use. The user interface 115 may then be reflowed, or updated, for right-handed use.

Turning now to FIGS. 3A-3D, shown are four examples of user interfaces 115a, 115b, 115c, and 115d rendered on a touch screen 203 of a computing device 100. The user interfaces 115 are rendered by a music player application 112 (FIG. 1) executed in the computing device 100.

Figure 3A:
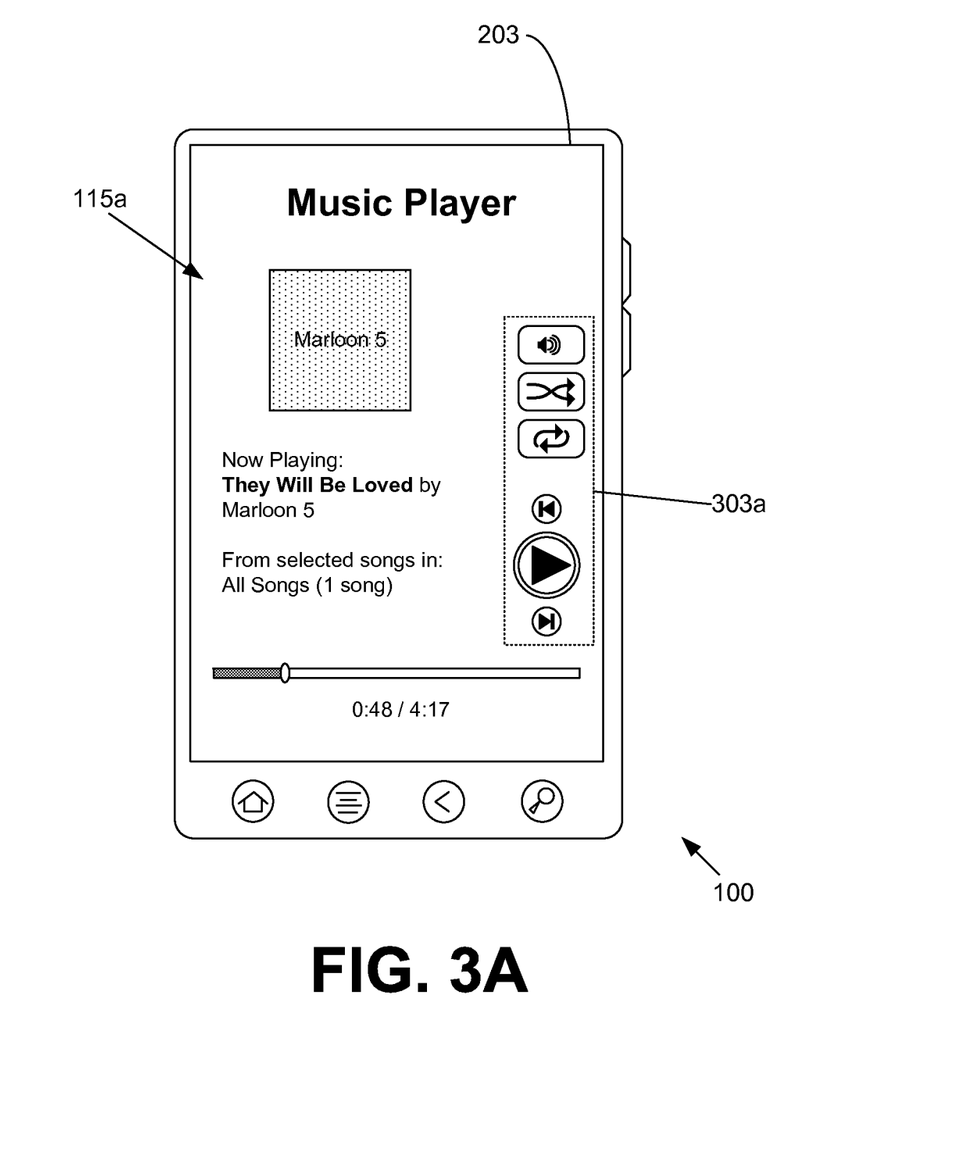
FIGS. 3A-3D illustrate examples of different user interfaces rendered in response to dominant hand preference determinations by the computing device of FIG. 1 according to various embodiments of the present disclosure.
Figure 3B:
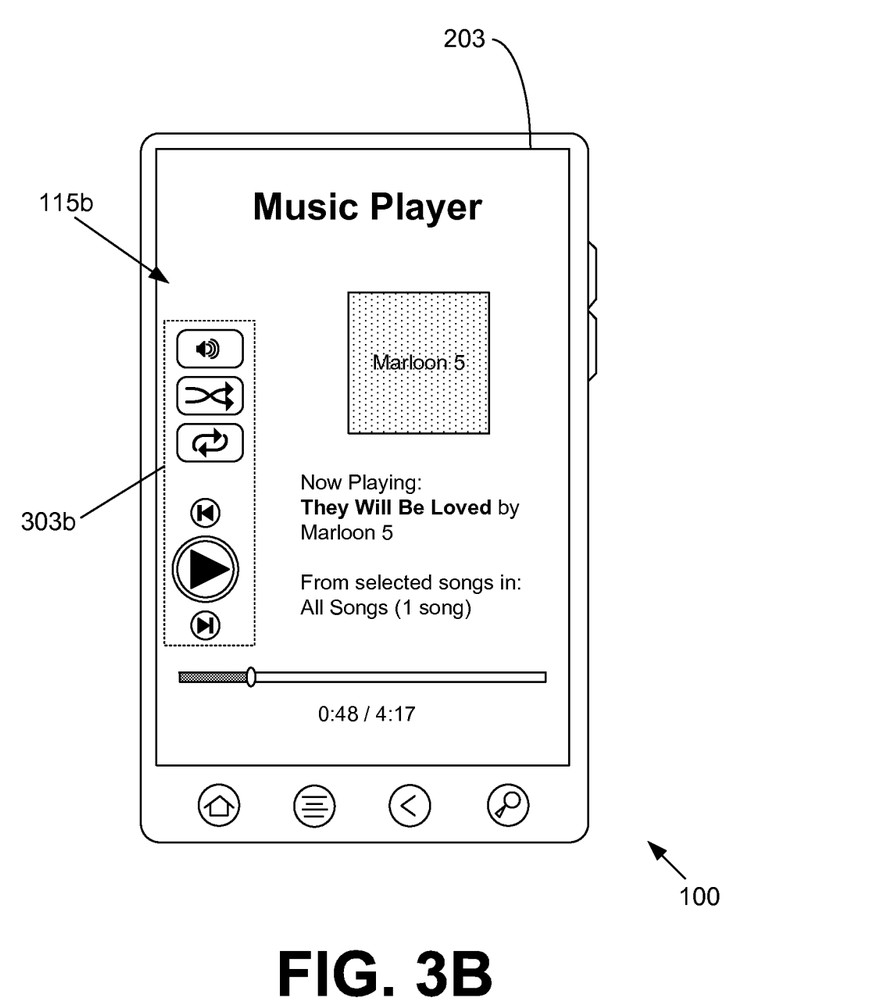

In the example of FIG. 3A, a right-handed preference has been detected, so the controls 303a of the user interface 115a are oriented toward the right side of the touch screen 203 to ease accessibility by the right hand. In the example of FIG. 3B, a left-handed preference has been detected, so the controls 303b are oriented toward the left side of the touch screen 203 to ease accessibility by the left hand. The other content and controls of the user interface 115b have been reflowed relative to the user interface 115b to account for the different position of the controls 303b as compared to the controls 303a.

Figure 3C:
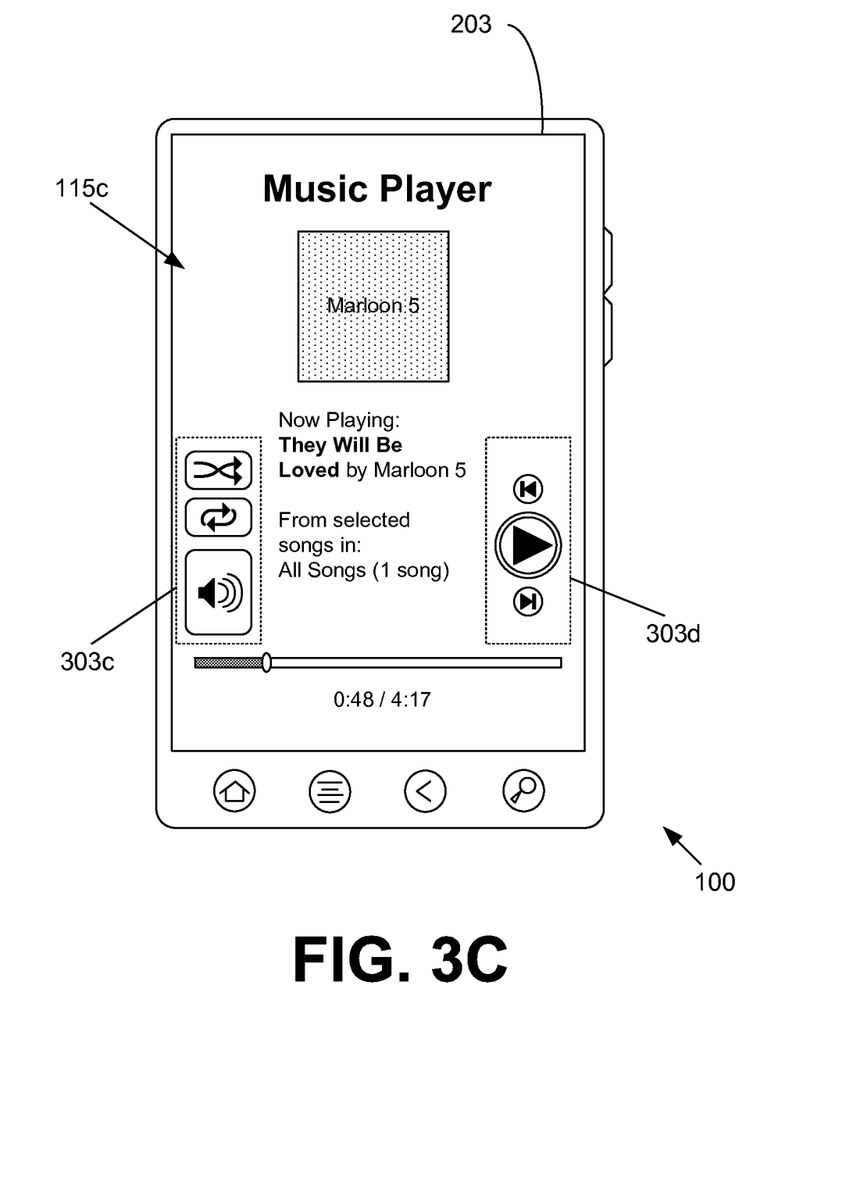
Figure 3D:
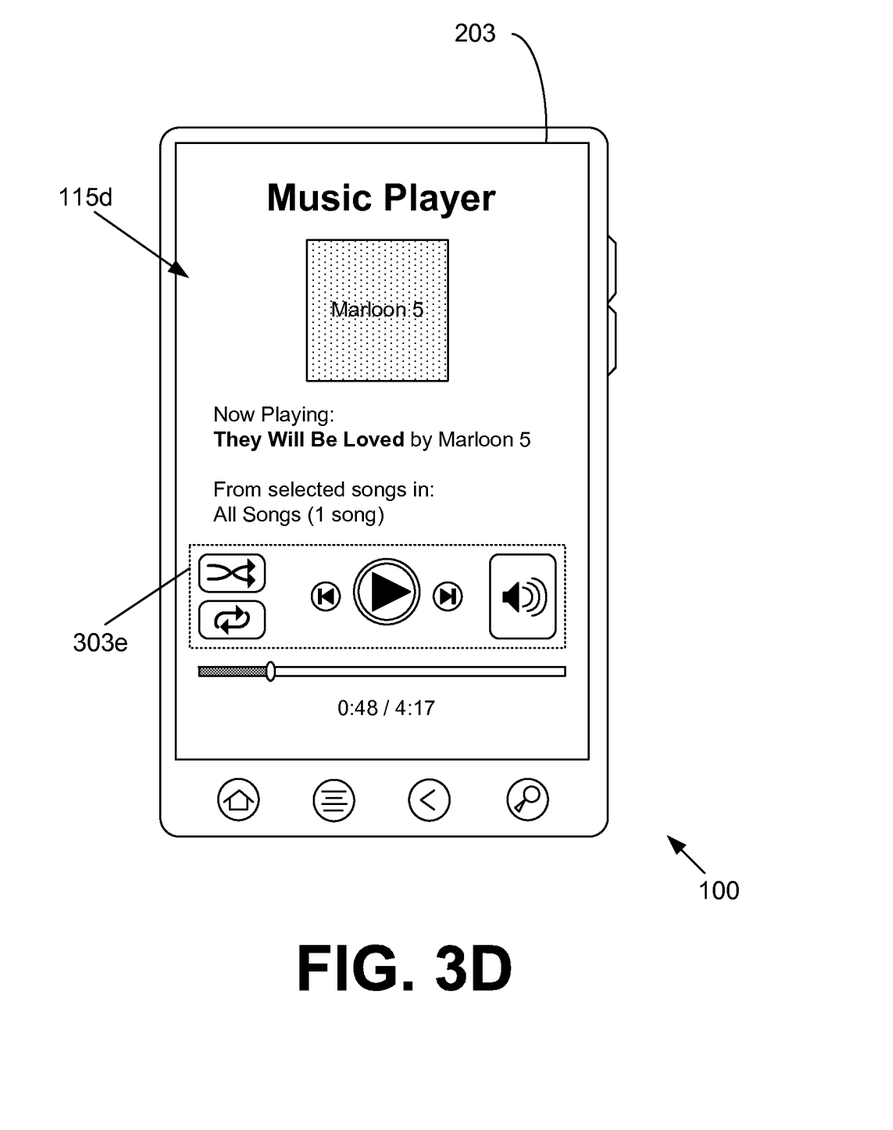

In the example of FIG. 3C, a preference for using both left and right hands has been identified. Accordingly, the control elements in the user interface 115c are split among the controls 303c on the left side and the controls 303d on the right side. In the example of FIG. 3D, no preference has been identified. Accordingly, the controls 303e are in a non-hand-specific location in the user interface 115c. The controls 303e may be equally accessible to either hand. In other embodiments, the user interfaces 115a, 115b, or 115c may be the default when no preference is identified, or if a preference for both hands is identified.

Figure 4:
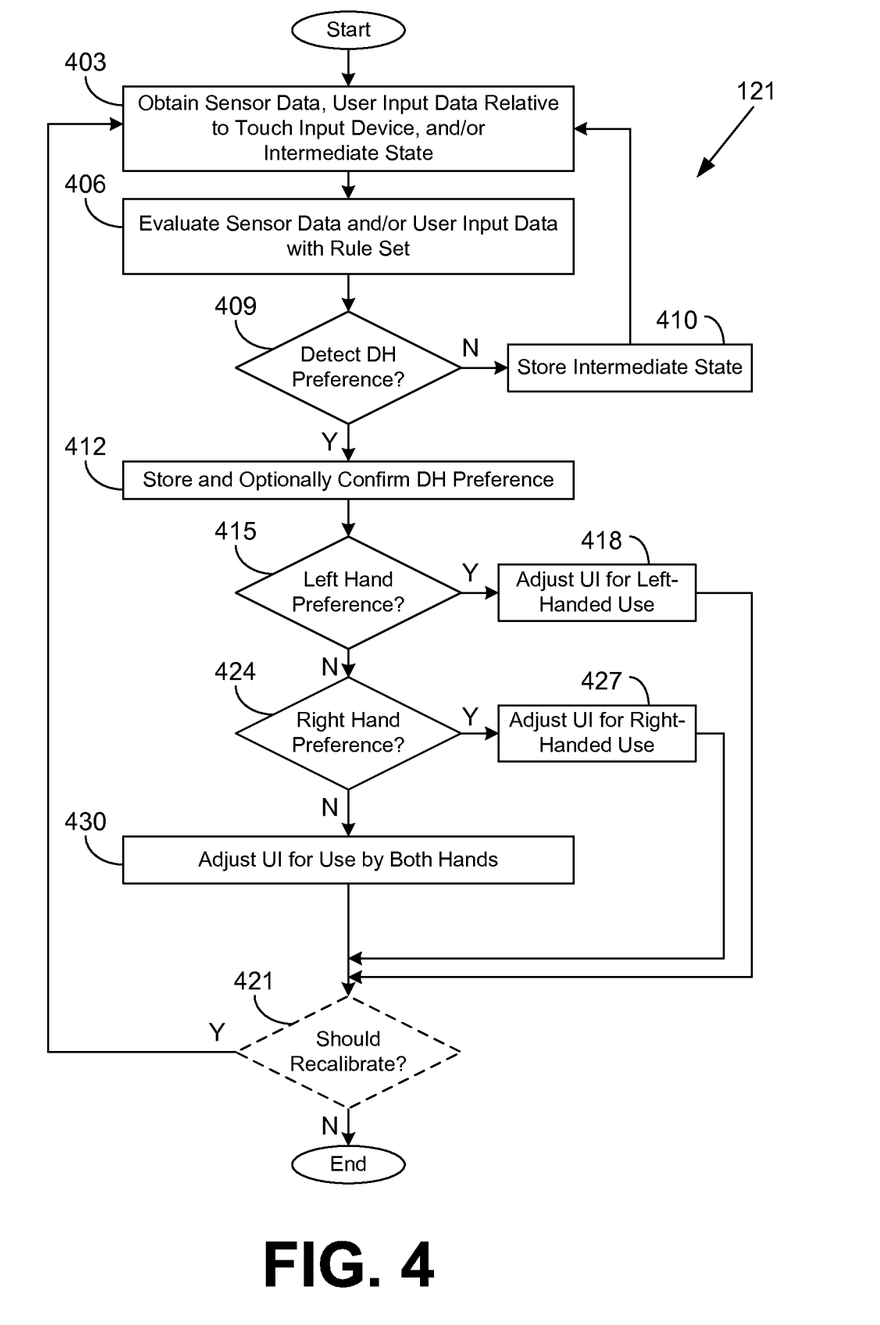
FIG. 4 is a flowchart illustrating one example of functionality implemented as portions of a dominant hand detection service executed in the computing device of FIG. 1 according to various embodiments of the present disclosure.

Referring next to FIG. 4, shown is a flowchart that provides one example of the operation of a portion of the dominant hand detection service 121 according to various embodiments. It is understood that the flowchart of FIG. 4 provides merely an example of the many different types of functional arrangements that may be employed to implement the operation of the portion of the dominant hand detection service 121 as described herein. As an alternative, the flowchart of FIG. 4 may be viewed as depicting an example of steps of a method implemented in the computing device 100 (FIG. 1) according to one or more embodiments.

Beginning with box 403, the dominant hand detection service 121 obtains sensor data from one or more of the sensor devices 106 (FIG. 1) and/or user input data relative to the touch input device 109 (FIG. 1). In box 406, the dominant hand detection service 121 evaluates the sensor data and/or the user input data with the detection rule set 127 (FIG. 1). The dominant hand detection service 121 may also evaluate intermediate state data previously saved by the dominant hand detection service 121. In box 409, the dominant hand detection service 121 determines whether a dominant hand preference 124 (FIG. 1) is automatically detected according to the detection rule set 127 using the sensor data and/or the user input data that has been acquired. If a dominant hand preference 124 is not detected, the dominant hand detection service 121 may store intermediate state data in box 410. Then, the dominant hand detection service 121 returns to box 403 and continues acquiring sensor data and/or user input data.

If a dominant hand preference 124 is automatically detected, the dominant hand detection service 121 proceeds instead from box 409 to box 412. In box 412, the dominant hand detection service 121, stores the dominant hand preference 124. In some embodiments, the dominant hand detection service 121 may confirm the dominant hand preference 124 with the user. As a non-limiting example, the dominant hand detection service 121 may render a dialog on the display 103 (FIG. 1) informing the user that a preference for right-handed use has been identified and allowing the user to confirm or reject the possible preference.

Next, in box 415, the dominant hand detection service 121 determines whether a left-hand preference has been identified. If a left-hand preference has been identified, in box 418 the dominant hand detection service 121 adjusts the user interface 115 (FIG. 1) of one or more applications 112 (FIG. 1) for left-handed use. The dominant hand detection service 121 proceeds to box 421. If a left-hand preference has not been identified, the dominant hand detection service 121 instead moves from box 415 to box 424.

In box 424, the dominant hand detection service 121 determines whether a right-hand preference has been identified. If a right-hand preference has been identified, in box 427 the dominant hand detection service 121 adjusts the user interface 115 for one or more applications 112 for right-handed use. The dominant hand detection service 121 proceeds to box 421. If a right-hand preference has not been identified, the dominant hand detection service 121 instead moves from box 424 to box 430. In box 430, because a preference for either the left hand or the right hand has not been identified, the dominant hand detection service 121 adjusts the user interface 115 for use by both hands, which may be used alternately or simultaneously. The dominant hand detection service 121 continues to box 421.

In box 421, the dominant hand detection service 121 optionally determines whether a stored dominant hand preference 124 is to be recalibrated or modified. In one example, a preference for a user may be initially stored and used for a device configuration lifetime. In other examples, a preference may be stored for each application 112 and/or a portion of each application 112 that renders a corresponding user interface 115. In yet another example, a preference may be continuously recalibrated for a user and/or other users of the computing device 100. If the dominant hand detection service 121 determines that the dominant hand preference 124 is to be recalibrated, the dominant hand detection service 121 returns to box 403 and continues acquiring data. Otherwise, the portion of the dominant hand detection service 121 ends.

Figure 5:
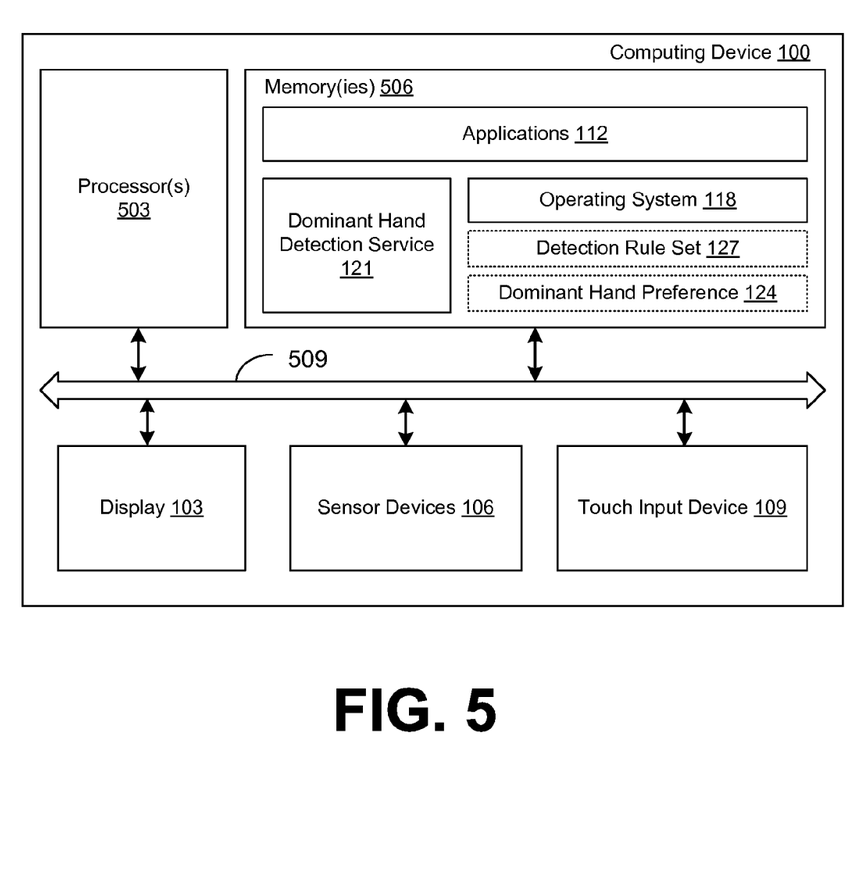
FIG. 5 is a schematic block diagram that provides another example illustration of the computing device of FIG. 1 according to various embodiments of the present disclosure.

With reference to FIG. 5, shown is a schematic block diagram of the computing device 100 according to an embodiment of the present disclosure. The computing device 100 includes at least one processor circuit, for example, having a processor 503 and a memory 506, both of which are coupled to a local interface 509. To this end, the computing device 100 may comprise, for example, at least one mobile computing system or like device. The local interface 509 may comprise, for example, a data bus with an accompanying address/control bus or other bus structure as can be appreciated. The local interface 509 may be coupled to the display 103, the sensor devices 106, the touch input device 109, and/or other devices.

Stored in the memory 506 are both data and several components that are executable by the processor 503. In particular, stored in the memory 506 and executable by the processor 503 are the applications 112, the dominant hand detection service 121, and potentially other applications. Also stored in the memory 506 may be the dominant hand preference 124, the detection rule set 127, and other data. In addition, an operating system 118 may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the applications 112, the dominant hand detection service 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the dominant hand detection service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the applications 112 and the dominant hand detection service 121, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a mobile computing device, the program comprising:
   code that, in response to receiving both sensor data from a plurality of sensor devices of the mobile computing device and touch input data from a user relative to a touch input device of the mobile computing device, automatically detects a dominant hand preference of the user based at least in part on an evaluation of the sensor data and the touch input data with a rule set, wherein the rule set is derived at least in part from a control data set associated with known dominant hand preferences of a plurality of other users, and wherein the sensor data and the touch input data are obtained implicitly through ordinary use of the mobile computing device by the user irrespective to dominant hand preference detection;
   code that renders a first user interface being configured for right-handed use when the dominant hand preference indicates that right-handed use is preferred;
   code that renders a second user interface being configured for left-handed use when the dominant hand preference indicates that left-handed use is preferred; and
   code that renders a third user interface being configured for left-handed use and right-handed use when the dominant hand preference indicates that use of both hands is preferred.

2. The non-transitory computer-readable medium of claim 1, wherein the touch input device is a touch screen of the mobile computing device, and the touch input data corresponds to a plurality of gestures relative to the touch screen.

3. The non-transitory computer-readable medium of claim 1, wherein the program further comprises code that stores the dominant hand preference as a persistent preference for the user.

4. A system, comprising:
a computing device; and
at least one application executable in the computing device, the at least one application comprising:
logic that automatically detects a dominant hand preference of a user of the computing device by obtaining input data during ordinary use of the computing device by the user irrespective to dominant hand preference detection, wherein the dominant hand preference is detected based at least in part on an evaluation of the input data with a rule set, the rule set being derived at least in part from a control set of input data associated with known dominant hand preferences of a plurality of other users; and
logic that automatically adapts a user interface rendered by the computing device based at least in part on the dominant hand preference.

5. The system of claim 4, wherein the computing device is a handheld mobile computing device.

6. The system of claim 4, wherein the logic that automatically detects the dominant hand preference is further configured to update the dominant hand preference in response to continued use of the computing device.

7. The system of claim 4, wherein the logic that automatically detects the dominant hand preference is further configured to receive a plurality of gestures by the user relative to a touch input device of the computing device, the plurality of gestures being received implicitly through ordinary use of the computing device by the user irrespective to dominant hand preference detection; and
wherein the dominant hand preference is detected based at least in part on the plurality of gestures.

8. The system of claim 7, wherein the logic that automatically detects the dominant hand preference further comprises:
logic that determines a finger imprint shape employed in at least one of the gestures; and
wherein the dominant hand preference is detected based at least in part on the finger imprint shape.

9. The system of claim 4, wherein the input data is obtained from at least one sensor device, the at least one sensor device including at least one of: a thermal sensor, a microphone, a moisture sensor, an ambient light sensor, a digital camera, an accelerometer, or a gyroscope.

10. The system of claim 4, wherein the logic that automatically adapts the user interface is further configured to automatically adapt a plurality of user interfaces corresponding to a plurality of different applications based at least in part on the dominant hand preference.

11. The system of claim 10, wherein the logic that automatically adapts the user interface is further configured to provide the dominant hand preference to the plurality of different applications by way of an application programming interface (API), and individual ones of the different applications are configured to render corresponding ones of the plurality of user interfaces based at least in part on the dominant hand preference provided by the API.

12. The system of claim 4, wherein the at least one application further comprises logic that stores the dominant hand preference as a persistent preference for the user.

13. The system of claim 4, wherein the logic that automatically detects the dominant preference further comprises:
logic that determines that the computing device is being picked up based at least in part on sensor data;
logic that analyzes the sensor data to determine whether the picking up of the computing device corresponds to a left-handed pickup profile or a right-handed pickup profile; and
wherein the dominant hand preference is based at least in part on whether the picking up of the computing device corresponds to the left-handed pickup profile or the right-handed pickup profile.

14. A method, comprising:
automatically detecting, via at least one of one or more hardware processors, the dominant hand preference of a user of the computing device by obtaining input data during ordinary use of the computing device by the user irrespective to dominant hand preference detection, wherein the dominant hand preference is detected based at least in part on an evaluation of the input data with a rule set, the rule set being derived at least in part from a control set of input data associated with known dominant hand preferences of a plurality of other users;
causing, via at least one of the one or more hardware processors, a first user interface being configured for right-handed use to be rendered when the dominant hand preference indicates that right-handed use is inferred; and
causing, via at least one of the one or more hardware processors, a second user interface being configured for left-handed use to be rendered when the dominant hand preference indicates that left-handed use is inferred.

15. The method of claim 14, further comprising causing, via at least one of the one or more hardware processors, a third user interface being configured for left-handed use and right-handed use to be rendered when the dominant hand preference indicates that use of both hands is inferred.

16. The method of claim 14, further comprising causing, via at least one of the one or more hardware processors, a default user interface to be rendered when the dominant hand preference indicates that no preference is inferred.

17. The method of claim 14, further comprising automatically detecting, via at least one of the one or more hardware processors, another dominant hand preference of another user.

18. The method of claim 14, wherein the dominant hand preference is detected without an intentional indication of the dominant hand preference by the user.

19. The method of claim 14, wherein the one or more hardware processors comprises a mobile computing device, and automatically detecting the dominant hand preference of the user further comprises:
determining, via at least one of the one or more hardware processors, that the mobile computing device is being picked up based at least in part on sensor data;
analyzing, via at least one of the one or more hardware processors, the sensor data to determine whether the picking up of the mobile computing device corresponds to a left-handed pickup profile or a right-handed pickup profile; and
wherein the dominant hand preference is based at least in part on whether the picking up of the mobile computing device corresponds to the left-handed pickup profile or the right-handed pickup profile.

20. The method of claim 14, wherein the one or more hardware processors comprises a mobile computing device, and automatically detecting the dominant hand preference of the user further comprises:

determining, via at least one of the one or more hardware processors, that the mobile computing device is being carried in a pocket of the user based at least in part on sensor data; and analyzing, via at least one of the one or more hardware processors, the sensor data to determine whether the pocket corresponds to a left-handed pocket profile or a right-handed pocket profile; and wherein the dominant hand preference is based at least in part on whether the pocket corresponds to the left-handed pocket profile or the right-handed pocket profile.

21. The method of claim 14, wherein the one or more hardware processors includes a touch input device, and automatically detecting the dominant hand preference of the user further comprises:

determining, via at least one of the one or more hardware processors, an activity frequency of the user relative to each one of a plurality of regions on the touch input device; and wherein the dominant hand preference is based at least in part on the activity frequencies relative to the regions.

\* \* \* \* \*

UNITED STATES PATENT AND TRADEMARK OFFICE
CERTIFICATE OF CORRECTION

| | | |
|---|---|---|
| PATENT NO. | : 8,760,426 B1 | Page 1 of 1 |
| APPLICATION NO. | : 13/429843 | |
| DATED | : June 24, 2014 | |
| INVENTOR(S) | : Strand et al. | |

It is certified that error appears in the above-identified patent and that said Letters Patent is hereby corrected as shown below:

In the Claims

Claim 14, at column 12; line 12, delete "the dominant hand preference" and replace with --a dominant hand preference--

Signed and Sealed this
Twenty-fourth Day of March, 2015

Michelle K. Lee
*Director of the United States Patent and Trademark Office*